United States Patent [19]

Kits van Heyningen et al.

[11] Patent Number: 5,020,902

[45] Date of Patent: Jun. 4, 1991

[54] RANGEFINDER WITH HEADS-UP DISPLAY

[75] Inventors: Martin A. Kits van Heyningen, Newport, R.I.; Robert C. Randall, Westport, Mass.

[73] Assignee: KVH Industries, Inc., Middletown, R.I.

[21] Appl. No.: 370,342

[22] Filed: Jun. 22, 1989

[51] Int. Cl.$^5$ .............................. G01C 3/06
[52] U.S. Cl. .................................. 356/21
[58] Field of Search .................... 356/20, 21; 340/705

[56] References Cited

U.S. PATENT DOCUMENTS

| | | | |
|---|---|---|---|
| 4,531,052 | 8/1985 | Moore | 235/404 |
| 4,617,741 | 10/1986 | Bordeaux et al. | 33/228 |
| 4,636,966 | 1/1987 | Hattori | 358/236 |
| 4,787,739 | 11/1988 | Gregory | 356/21 |

Primary Examiner—F. L. Evans
Attorney, Agent, or Firm—Wolf, Greenfield & Sacks

[57] ABSTRACT

A method and apparatus for performing range finding and a unique heads-up display for use in such apparatus are provided. Range finding is performed by viewing an object of known height at the location to which a range determination is being made through a transparent digital display on which a reticle is provided. The reticle is preferably in segments with the user adding or substracting segments from the reticle until its height matches that of the sighted image. A processor is provided to which the known height of the object is inputted, either by the user or from storage, with the processor determining range from this known height and the number of segments in the reticle. The range is displayed on the transparent display, permitting a user to simultaneously view both the object and the range indication.

13 Claims, 1 Drawing Sheet

RANGEFINDER WITH HEADS-UP DISPLAY

FIELD OF THE INVENTION

This invention relates to a method and apparatus for performing rangefinding and to a unique heads-up display suitable for use with such a rangefinder.

BACKGROUND OF THE INVENTION

There are many applications where one needs to determine range from the user's current location to a selected point. These applications include determining the range to a mark in sailboat racing, various other marine navigational situations, other recreational applications such as hiking, bird watching, orienteering, camping, cross country skiing, hunting and the like and various professional and military applications.

While a number of rangefinder devices currently exist, most are either relatively complex and expensive, requiring some degree of sophistication on the part of the user in order to achieve acceptable results; or, while simple, require that the user perform mathematical calculations to achieve range values.

A need therefore exists for a relatively simple, inexpensive rangefinder device which is relatively easy to use, providing rapid and accurate range values while requiring minimum sophistication and no calculations on the part of the user. In particular, most rangefinder devices operate by sighting on an object of known height at the distant point to which range is being determined and then utilizing the apparent height of this object to compute range. With existing devices, the user is frequently required to do a sighting, then look away to take readings from various displays or to do calculations and then back to do additional sightings. This multiple step procedure could be simplified if a heads-up display were provided which permitted the object being sighted on to be viewed through the display on which range and other values appear so that the user would be able to perform all required operations, and obtain a range indication, while continuously viewing the sighting object.

SUMMARY OF THE INVENTION

It is therefore a primary object of this invention to provide an improved rangefinding device. More particularly, it is an object of this invention to provide a rangefinding device which is simpler, less expensive, and easier to use than prior such devices and in particular which provides a unique heads-up display which permits the user to make all necessary inputs and to obtain a range reading while continuously viewing the object being sighted on.

In accordance with the above, this invention provides a method and apparatus for performing rangefinding which utilizes a digital display and provides a means for viewing an object having a known dimension, such as height, which object is located at the point to which a range determination is being made. The image of the object is focused at the digital display and the known dimension of the object is obtained either in response to user inputs or from a memory where it is prestored. A reticle is also generated on the display in response to user input, the extent of the reticle in the dimension being proportional to the extent of the image in that dimension. The process utilizes the inputted information concerning the known dimension and the extent of the reticle to determine the range to the point. For preferred embodiments, the dimension is height, the reticle is formed of segments, such as bar segments or light emitting elements, the number of segments being increased and decreased respectively in response to user input. The number of segments in the reticle is selected such that the height of the reticle is substantially equal to the height of the object image at the display. With this embodiment, the range is determined in accordance with the formula: range=$KH/N$ where $K$ is a constant for the given rangefinder, $H$ is the known height of the object, and $N$ is the number of segments forming the reticle.

For a preferred embodiment, the digital display is transparent and is positioned in the optical path such that the object is viewed through this display. This permits simultaneous viewing of the digital display and the object. The digital display may be a liquid crystal display, each cell of which display may be in a first or second state, the display being substantially transparent when in the first state and substantially opaque when in the second state. The display may also be formed by light emitting elements, such as light emitting diodes (LED's) positioned along an edge or edges of the display.

The foregoing and other objects, features and advantages of the invention will be apparent from the following more particular description of a preferred embodiment as illustrated in the accompanying drawings.

IN THE DRAWINGS

DETAILED DESCRIPTION

Figure 1:
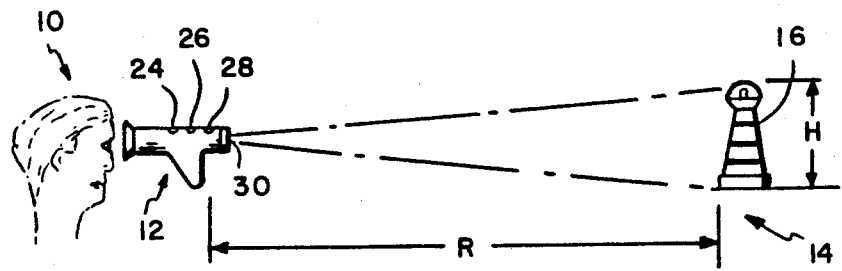
FIG. 1 is a diagram illustrating the environment which the rangefinder of this invention may be utilized.

FIG. 1 illustrates an application of the invention wherein a user 10 is utilizing the device 12 to determine the range R from the user's location to a point 14 at which is located an object such as lighthouse 16 which object has a known height H.

Figure 2:
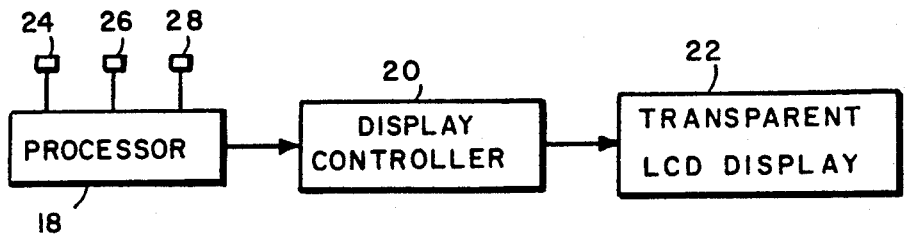
FIG. 2 is a schematic diagram illustrating the electronic circuitry of the rangefinder for a preferred embodiment of the invention.

As is illustrated in FIG. 2, the device 12 contains a processor 18 which may for example be a standard microprocessor such as NEC 75308. Processor 18 among other things is utilized to control a standard liquid crystal display (LCD) controller 20 which in turn controls a light transmission type liquid crystal display 22. Display 22 consists of a matrix of liquid crystal cells each of which may be energized by controller 20 to be in one of two states; a first state in which the cell is substantially transparent, permitting light impinging thereon to pass through, and an opaque state. It should, however, be noted that while for the preferred embodiment, the liquid crystal display has only two states, it is within the contemplation of the invention for the liquid crystal to have two or more states. Further, the liquid crystal cells need not be completely transparent in the "transparent" state so long as most light incident thereon passes through; and the display need not be completely opaque in the "opaque" state so long as this state provides adequate contrast for viewing with the transparent state. Three button switches 24-28, which are preferably located on the top of device 12 as shown in FIG. 1, are provided for permitting user 10 to input data to processor 18. The manner in which the switches are utilized for inputting data will be discussed shortly.

Figure 3:
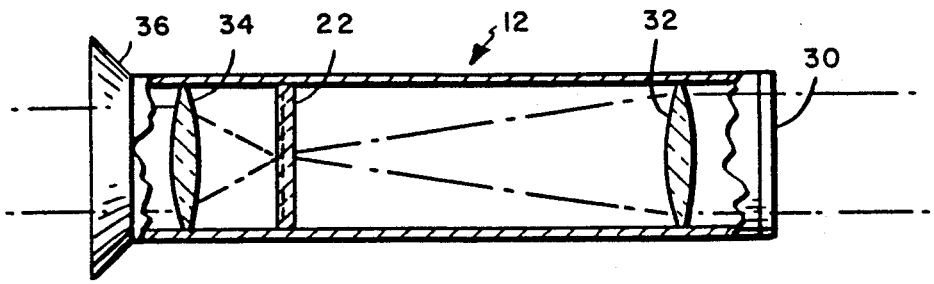
FIG. 3 is a diagram illustrating in simplified form the display optics for a preferred embodiment of the invention.

FIG. 3 is a simplified optical diagram of the device 12. Light received from for example lighthouse 16 is received at the device 12 and passes through an opening 30 in the front face thereof which opening may be covered with optical glass or other suitable means. The light passes through an optical system 31 which includes at least a focusing lens 32 and may also include one or more inverting prisms. Lens 32, or other elements in optical system 31, may provide some magnification and is also operative to focus the received light at the point in the device 22 where LCD 22 is located. Light passing through the transparent cells of display 22 is received at magnifying lens 34 which passes the light through a standard eyepiece 36 to user 10. As will be discussed in greater detail hereinafter, in addition to passing the image received from opening 30, LCD 22 may also have various images digitally generated thereon by processor 18 and display controller 20. These images may be in the form of one or more reticles, and various alphanumeric information. Since the image received at opening 30 is focused at the LCD display 22, the image received at the display and any digital information generated on the display appear to originate at the same point, resulting in the digital display being superimposed on the received image as they are viewed by user 10.

In operation, the device 12 may have a variety of modes in which it operates. Button switch 28 may be pressed to step the device through its various modes, processor 18 causing LCD display 22 to display an indication of the current mode.

Figure 4:
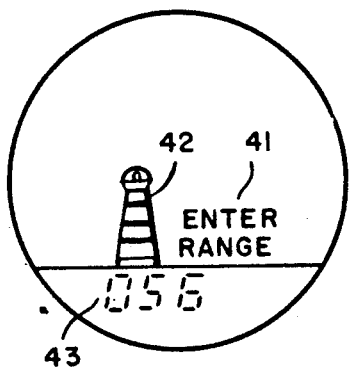
FIGS. 4-6 are diagrams of illustrative displays, including both digital displays and viewed objects, which might be obtained in practicing the teachings of this invention.

Referring to FIG. 4, the first step in the range determination is for the known height of the object being sighted on, for example lighthouse 16, to be entered into processor 18. Button 28 is thus operated until the device is in the "enter height" mode. When in this mode, a mode indication 41 and a number of digits 43 appear at selected points on the liquid crystal display 22. For example, in FIG. 4, three digits are shown at the bottom of the display. When the system first enters the "enter height" mode, one of these digits, for example the most significant digit, will be caused to flash in known manner. The digits 43 initially appearing on display 22 may for example be all zeros.

The known height for the object 16 may be obtained in maritime applications from various books and charts which contain height information for standard landmarks. Where such books or charts are not available, or where a landmark object does not appear at the point of interest, an object at such point may be selected, the height of which may be easily estimated. For example, a tree, ship mast, one- or two-story building, or the like may be selected and the height of such object estimated with sufficient accuracy that a reasonably accurate range determination can be made. It should at this point also be noted that the device is not in any way limited to operating only with height, and may be utilized with equal effect where another dimension such as length or width is known. All that is required is that the known dimension be entered during the "enter height" mode, and that the same dimension as was entered be utilized in making the range determination.

At this point it should also be noted that units are not of concern in making the range determination. Whatever units the height or other dimension entered are in is the units in which the range will be determined. Thus, if the known height is entered in feet, the range determination will also be made in feet, while if the known height is entered in meters the range will also be provided in meters.

The known height is entered by operating button 24 to increment the flashing digit, for example the most significant digit. When the value of this digit is equal to the value of this digit for the known height, button 26 may be operated. This causes the value for the selected digit to be entered into processor 18 and causes the next digit, for example the second most significant digit, to blink. Button 24 is then operated to increment this digit to its desired value, button 26 is operated to enter the selected value of this digit and to cause the next succeeding digit to blink and this process is repeated until all digits of the known height have been entered. When this occurs, button 28 is operated to step the device into its "range" mode. It should be noted that all of the operations described above can be performed by operator 10 with one hand while continuing to view the object 16 through the device 12.

Figure 5:
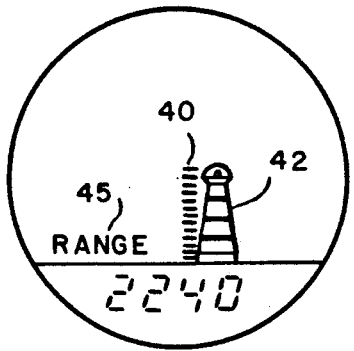

Referring to FIG. 5, when the device is in the "range" mode, a range mode indication 45 and a reticle in the form of bar segments 40 appear on display 22. The device may be moved so that the image 42 of the object 16, which image appears at display 22, is adjacent the reticle. If the number of bar segments 40 is too great so that the reticle is higher than image 42, button 24 mag be successively operated to cause bar segments 40 to be removed from the reticle. Similarly, if the reticle is too low, button 26 may be operated to cause bar segments to be added to the reticle. This process may be repeated until the operator is satisfied that the number of bar segments 40 in the reticle results in the reticle being substantially equal in height to the image 42.

Processor 18 keeps track of the number of bar segments 40 appearing in the reticle at any given time and provides an indication of range based on the number of bar segments in the reticle in accordance with the formula:

$$\text{Range } (R) = KH/N \qquad (1)$$

where: K = a constant for a given device 12 having a given set of optics (including magnification) and reticle spacing;
H = the known height of the object 16; and
N = the number of bar segments 40 in the reticle.

Thus, when the number of bar segments 40 is such that the reticle height is equal to the height of image 42, the range being displayed on display 22 will be the desired range. Thus, referring to FIG. 5, the range for this reading is 2240. As previously indicated, the units for this range will ge the same as the units for the known height entered during the "enter height" mode. Thus, if the known height was entered in feet, the range in FIG. 5 would be 2240 feet.

Figure 6:
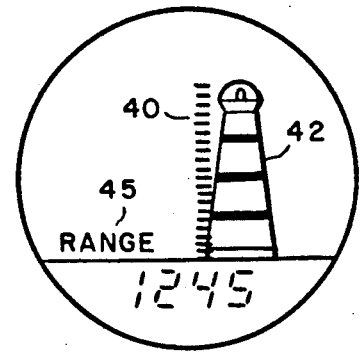

As the user nears the object, the image of the object will appear larger on display 22 resulting in a greater number of bar segments 40 being required in order for the height of the reticle to equal the height of the image. From equation 1, it is seen that this indicates a reduced range. Thus, referring to FIG. 6, it is seen that a range reading taken from a position closer to the object 16 provides a range of 1245. Since the known height entered during the "enter height" mode remains the same, a number of successive range readings may be taken on the same object 16 without having to return to the "enter height" mode.

While in the description so far, an "enter height" mode has been provided during which the height of the object being sighted on is entered into processor 18. In some applications, such as for use as a golf range finder, a single height may be entered frequently enough that it is retained in a register or memory associated with processor 18 or forming part thereof and is either automatically entered as the known height when a range determination is to be made, is entered as the known height unless another height is inputted during an "enter height" mode preceding the range determination or is automatically entered only when the device is stepped to be in a special range mode. An example of where this mode of operation would be utilized is for a golf range finder where the height of the pin or flag at the golf hole is normally a standard 7 feet 6 inches and the range to the hole is normally the range of interest to the golfer. However, since a golfer may also be interested in the range to a hazard such as a sand trap or a water hazard, the range to a dog leg, or other intermediate ranges, fixed known height and variable known height capabilities may be provided.

Further, while two modes of operating for the system have been described above, it is possible to program processor 18 to accept additional inputs and to operate in additional modes to display on display 22 selected information obtained from such inputs, derived from the input information or otherwise generated. Additional modes might include a chronometer mode, a compass or bearing mode and the like.

It has also been assumed above that inputs are provided by operating buttons 24-28 in a predetermined sequence. The three functions of each of the buttons described above are obviously for purposes of illustration and could be altered for a specific application. Other standard forms of input devices, such as dials or sliders, might also be utilized to perform various ones of the functions instead of the buttons.

Further, while the display for the preferred embodiment is an LCD display, other forms of digital display might also be utilized. For example, clear glass or empty space may be provided over most of the area where the display is located to permit viewing of the object being sighted on, such as lighthouse 16, with a linear array of light emitting elements, such as light emitting diodes (LED's) along one vertical edge of the display, which linear array functions as the reticle in the same manner as the segments 40. A plurality of LED matrix arrays may be provided along a second edge of the display, for example, the bottom of the display, for the display of alphanumeric characters. The system would otherwise function in the same manner described above.

A simple, compact, relatively inexpensive, and very easy to use rangefinder is thus provided which rangefinder utilizes an unique "heads-up" display permitting both optical and the digital information to be simultaneously viewed. While the invention has been particularly shown and described above with reference to a preferred embodiment, it is apparent that the foregoing and other changes in form and detail may be made therein by one skilled in the art without departing from the spirit and scope of the invention.

What is claimed is:

1. A rangefinder comprising:
a digital display;
means for viewing an object having a known dimension (D) located at a point to which a range determination is to be made, said viewing means including means for focusing an image of said object at said display;
processing means;
means for inputting said known dimension to said processing means;
means responsive to user input for generating a reticle on said display, said reticle being formed of display segments of predetermined size in said dimension, said reticle generating means including means responsive to a first user input for increasing the number of said segments, and means responsive to a second user input for decreasing the number of said display segments, the number of said display signals in said dimension after said user inputs being proportional to the extent of said image in said dimension;
means for inputting the number of display segments in said dimension to said processing means;
said processing means including means responsive to said known dimension and said number of display segments for determining the range to said point.

2. A rangefinder as claimed in claim 1 wherein said dimension is height (H).

3. A rangefinder as claimed in claim 2 wherein the combined height of said number of display segments is substantially equal to the height of said image at the display.

4. A rangefinder as claimed in claim 3 wherein said range determining means determines range in accordance with the formula: Range=KH/N; where H is the known height of the object, N is the number of segments forming the reticle, and K is a constant for a given rangefinder.

5. A rangefinder as claimed in claim 1 wherein said means for viewing includes means for magnifying the image formed at said display.

6. A rangefinder as claimed in claim 1 wherein said digital display is transparent and is positioned in said viewing means such that the object is viewed through said display, whereby a digital display and a viewed object may be simultaneously viewed; and wherein said means for inputting includes means for placing the processor in an "enter dimension" mode, means responsive to the processor being in the enter dimension mode for displaying an initial multidigit number on said display, and means responsive to user inputs for converting said initial number to said known dimension.

7. A rangefinder as claimed in claim 6 wherein one digit of said initial number is initially blinking; and
wherein said means for converting includes means responsive to user input for stepping the blinking number to the value of that number for the known dimensions, and means for entering the value of the blinking digit and causing a next digit to blink until all digits of the known dimension have been entered.

8. A rangefinder as claimed in claim 1 wherein said display includes a linear array of light emitting elements aligned in said dimension along a first edge of said display and selectively operable by said means for generating to form said reticle.

9. A rangefinder as claimed in claim 8 wherein said light emitting elements are light emitting diodes (LED's); and
  including a plurality of LED arrays, each adapted to display an alphanumeric character, aligned along a second edge of said display.

10. A heads-up display device comprising;
  a light transmission liquid crystal display having a plurality of display cells, each of which cells may be in a first or second state, said cells being substantially transparent when in said first state and substantially opaque when in said second state;
  means for digitally controlling said display to cause each of said cells to selectively be in said first or said second state, said means including means for generating a reticle of bar segments on said display, means responsive to a first user input for increasing the number of said bar segments, and means responsive to a second user input for decreasing the number of said bar segments; and
  means for providing an optical path through said display to a distant object, said means including means for focusing an image of said object at said display, and means for simultaneously viewing said focused image and said reticle of bar segments.

11. A device as claimed in claim 10 wherein said digital control means is operative in a plurality of different modes; and
  wherein said display includes means for displaying the current operating mode of said digital control means.

12. A method for determining the range to a point comprising the steps of:
  viewing an object at said point through a transparent digital display;
  focusing an image of said object on said display;
  utilizing said digital display to record a known dimension of said object;
  generating a reticle of bar segments on said display;
  controlling the number of said reticle bar segments in said dimension to be proportional to the extent of said image in said dimension by increasing the number of bar segments in response to a first user input and decreasing the number of bar segments in response to a second user input; and
  utilizing said known dimension and the number of said bar segments to determine said range.

13. A method as claimed in claim 12 wherein said dimension is height;
  wherein the range determining step determines range in accordance with the formula: Range=KH/N; where N is the number of bar segments forming the reticle, K is a constant for a given rangefinder, and H is the known height of the object.

* * * * *